Dec. 6, 1960                A. KREIDLER                2,962,813
METHOD OF MAKING ARTICLES WITH AN EMBEDDED CORE
Filed April 9, 1955                                    4 Sheets-Sheet 1

INVENTOR
Alfred Kreidler
BY

Dec. 6, 1960    A. KREIDLER    2,962,813
METHOD OF MAKING ARTICLES WITH AN EMBEDDED CORE
Filed April 9, 1955    4 Sheets-Sheet 3
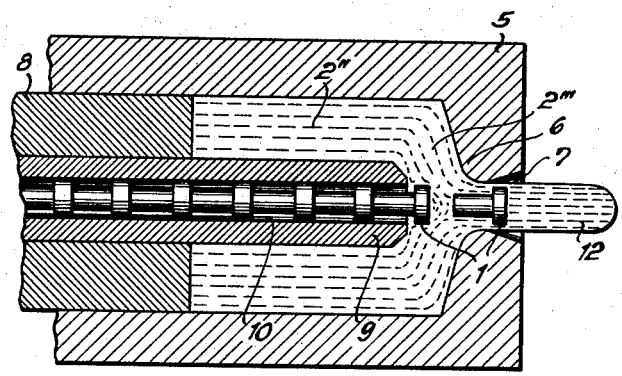
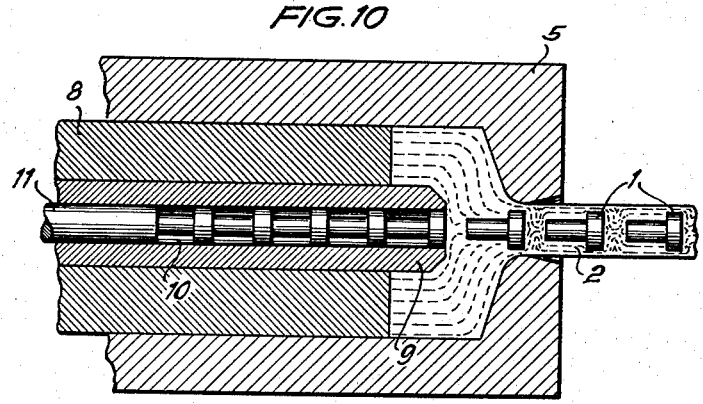
INVENTOR
Alfred Kreidler

United States Patent Office 2,962,813
Patented Dec. 6, 1960

2,962,813

METHOD OF MAKING ARTICLES WITH AN EMBEDDED CORE

Alfred Kreidler, 1 Gaensheidestrasse, Stuttgart, Germany

Filed Aug. 9, 1955, Ser. No. 527,370

Claims priority, application Germany Aug. 16, 1950

5 Claims. (Cl. 29—528)

The present invention relates to articles comprising a core embedded in a casing material and to a method of making such articles.

This is a continuation-in-part of applicant's copending patent application, Serial No. 241,374, filed August 10, 1951.

It often happens that the outer surface of a finished article is required to have certain properties such as, for example, that it should be capable of being polished, should resist corrosion, should be an electrical conductor, etc. In such cases, instead of the entire article being made of a material having the requisite properties, a coating of that material is often applied to a core of a different material, by plating, galvanizing, etc. This is sometimes done, in order to save expense or weight, and a material that is of little value or light in weight is then used for the core e.g. iron, wood, gypsum, etc., or sometimes to increase the utility of the article (e.g. its strength or flexibility).

Therefore sheet metal or metal hoops or bands have been covered on one or both surfaces with a coating material, whilst rods and tubes have been covered externally with such coatings. The ends and edges, however, remained uncovered, and during subsequent manufacturing processes the underlying material became visible at various points, which detracted from the surface properties aimed at in the coating process.

It is, therefore, one object of the present invention to embed the core material in an encasing material of such thickness that it is not laid bare either by subsequent cutting, turning, and so forth or by other manufacturing processes not involving cutting.

It is another object of the present invention to embed one or a plurality of core bodies into encasing material of a thickness of at least 0.5 mm. or more.

It is still another object of the present invention to provide a plurality of core bodies which are embedded in an encasing material spaced apart in such manner that working of the encasing material is possible without laying bare the core bodies.

It is yet another object of the present invention to provide a method of manufacturing a plurality of articles which comprise a plurality of core bodies embedded in an encasing material comprising the steps of feeding a plurality of core bodies in stacked arrangement through a hollow core-bar disposed in a hollow body into an extrusion press and to embed successively each of said core bodies in the material of said hollow body during the extrusion of the latter.

It is also another object of the present invention to provide in the described method a continuous feeding of a hollow core-bar into a hollow body formed to the encasing material during the extrusion step, while a plurality of core bodies are fed through said hollow core-bar successively into said hollow body in intermittent steps.

With these and other objects in view, which will become apparent in the following detailed description, the present invention will be clearly understood in connection with the accompanying drawings, in which:

Figs. 9 and 10 show similar axial sections in two different advanced stages of progress in the ejection;

Figure 1:
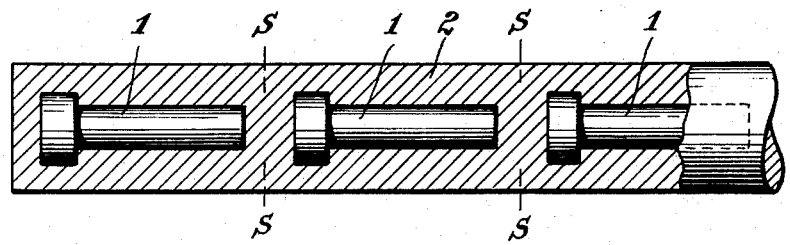
Figure 1 shows an encased rod for the production of threaded bolts, in longitudinal section.
Figure 2:
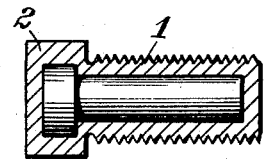
Fig. 2 shows, in longitudinal section, a threaded bolt manufactured from the rod shown in Fig. 1.

Referring now to the drawings and in particular to Figs. 1 to 5, in the encased rod shown in Fig. 1, iron cores 1 shaped with head and shank to the form of the bolt to be produced are embedded at intervals in an encasing material 2, which has a thickness of at least 0.5 mm. or more. In many cases it will be thought sufficient to use cylindrical core pieces, without head and shank. The spaces between the core pieces 1 are sufficient to ensure that the core material shall not be laid bare during the ensuing manufacturing process and in order to bring about this result, it is preferred to provide the encasing material between each pair of adjacent cores at a greater thickness than that surrounding the other faces of the core. The encasing material 2 may be brass, synthetic resin or similar material, as required. The rod is sawn through or parted-off at the points S—S and the separate pieces formed into bolts (as shown in Fig. 2) on a lathe or milling machine. Alternatively, the thread might be rolled or the head pressed, and, sometimes, it is advisable to turn the rod intact into individual bolts on the lathe and then to part these off individually from the rod at the points S—S. A steel or iron core will add to the strength of the bolts, which is particularly important in the case of bolts made from synthetic materials. In the case of brass threaded bolts, the core serves principally to save brass.

Figure 3:
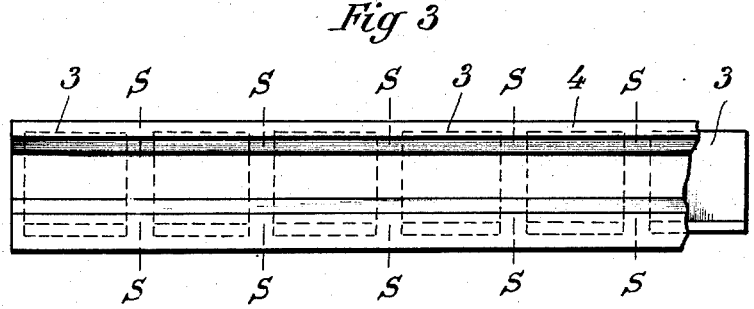
Fig. 3 is a plan view of an encased strip moulding for the production of contacts for electric switches.
Figure 4:
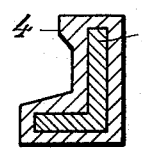
Fig. 4 is a cross-section through such a contact.
Figure 5:
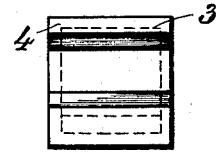
Fig. 5 is an elevational view of such a contact.
Figure 6:
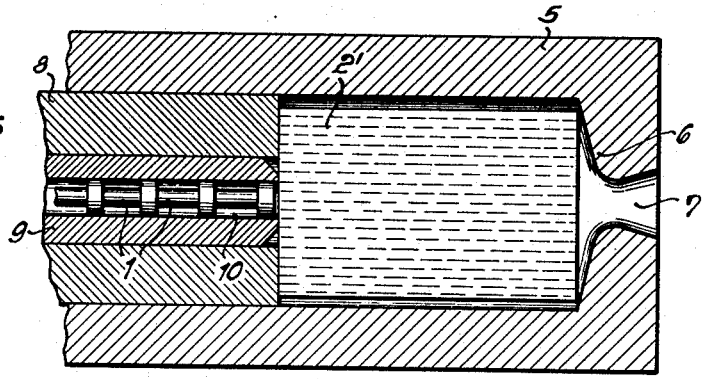
Fig. 6 is an axial section through an extrusion press containing a bar therein before piercing.

The contact illustrated in Figs. 4 and 5 is produced by cutting into individual parts an encased strip moulding as shown in Fig. 3, which consists of a series of cores 3 embedded in a brass casing 4. Here also the cuts are made at the points S—S between the core pieces 3, so that the latter remain covered on all their surfaces by the encasing material 4, which is substantially of the same thickness as disclosed in connection with the embodiment shown in Fig. 1. The purpose of applying the invention in this case is primarily to save brass. As Fig. 4 shows, the cores 3 in this case are designed as angle-pieces having the approximate contour of the finished contact.

As has been mentioned, the finished article may be shaped not only by cutting, turning, etc., but also by methods not involving cutting, especially when the encasing material is of a mouldable nature. In this event the core material may also sometimes be re-shaped together with the encasing material, as will be set forth later, provided that care is taken that it is not anywhere forced through the surface. The form of the core pieces can be adapted to other requirements such as, for example, a required predetermined distribution of stresses.

Referring now again to the drawings and in particular to Figs. 6 to 10, the encasing material is inserted into the hollow extruding body 5 of an extruding press in form of a solid bar 2'. The end of the body 5 is formed to a matrice 6 which includes a nozzle 7. A hollow ram 8 is axially movable in the body 5, which ram 8 in turn receives the hollow punch 9 for axial movement therein. The punch 9 functions as means for penetrating the solid bar 2' as well as means for feeding the core bodies 1 into the encasing material. In order to bring about the feeding of the core bodies 1, the latter are stacked in the longitudinal bore 10 of the punch 9. A stamp 11 is provided at the rear end of the stacked core bodies 1 (Fig. 10) which stamp 11 fits into the bore 10 of the punch 9 and advances the entire stack of core bodies 1. The advancement of the ram 8, the punch 9 and the stamp 11 is achieved independently from each other and, preferably, by conventional hydraulic means. The nozzle 7, the ram 8 and the punch 9 with its bore 10 are disposed coaxially towards each other. The diameter of the bore 10 corresponds with the greatest diameter of the core pieces 1, so that the latter may be fed therethrough by operation of the stamp 11, and the open diameter of the nozzle 7 surpasses the diameter of the bore 10 merely for the double of the required thickness of the encasing material.

Figure 7:
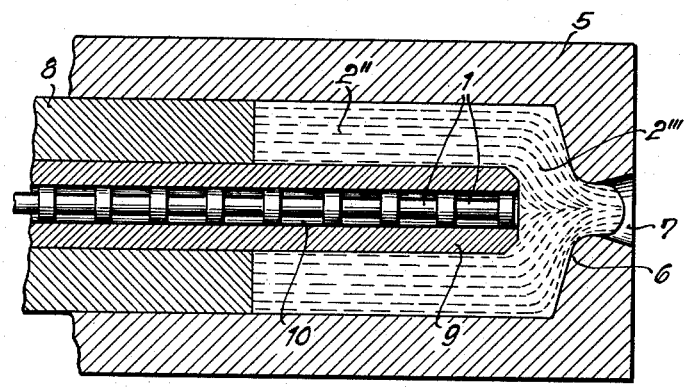
Fig. 7 is an axial section through an extrusion press after piercing of the bar.

The above described device for manufacturing the said articles is operated in the following manner:

Upon inserting the solid bar 2' into the hollow body 5, the ram 8 is introduced and advanced until it engages the bar 2'. Then the punch 9 is introduced into the bore of the ram 8 and likewise advanced until it engages the bar 2'. Then the punch 9 is further advanced into the bar 2' to form a bore in the latter, (Fig. 7). Since the bore 10 of the hollow punch 9 is filled up with the core bodies 1 which are supported by the stamp 11, any penetration of material of the bar 2' into the bore 10 is prevented during the advancement of the punch 9 into the bar 2'. The punch 9 is advanced into the bar 2' until it reaches a position in which its front end is spaced from the nozzle 7 for about the length of a core body 1 or even less.

Figure 8:
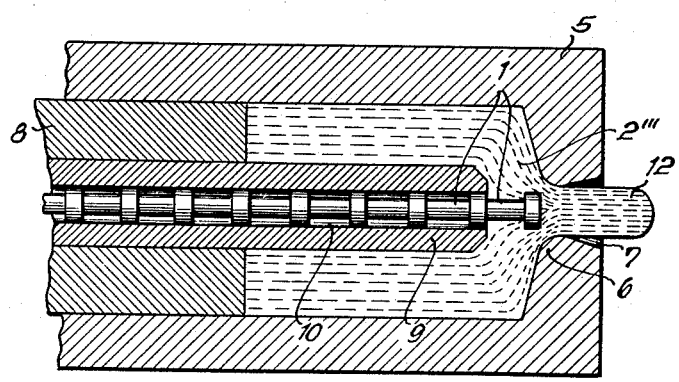
Fig. 8 is a similar axial section after the ejection of the bar through a nozzle has started.

At this point, the extrusion process of the bar 2' through the nozzle 7 is started, by advancing the ram 8 continuously, thereby forcing the encasing material 2''' through the ring-like cross-section formed between the punch 9 and the matrice 6 into the nozzle 7. The simultaneous advancement of the stamp 11 and, thereby, of the stack of core bodies 1 forces the first one of the latter into the flowing encasing material 2''' (Fig. 8). After sufficient penetration of the first core body 1 into the flowing material 2''', the latter grips the core body 1 and receives and carries the latter during its continued flow through the nozzle 7, thereby separating the first of the core bodies 1 from the second one and forming a distance therebetween. This result is still enhanced, if the core body 1 is of a design comprising a head at its rear end and a shaft projecting forwardly therefrom, as demonstrated in the drawing. Furthermore, in order to achieve this end, the ram 8 must be moved with sufficient speed, so that the flowing speed of the encasing material is greater than that at which the core bodies are removed from the punch 9. The encasing material enters the space formed between the first and second core body, while the first core body travels through the nozzle 7 within the rod 12 (Fig. 9). During its travel through the nozzle 7 the encasing material 2 is urged towards the core body 1 for complete enclosure thereof. The same cycle is repeated for the advancement of the following core bodies in such manner that a rod 12 is formed which contains the core bodies 1 embedded equally spaced in the encasing material (Fig. 10).

In order to arrive at the required distance between the individual core bodies in the rod 12, it is necessary to establish the proper relation between the speed of advancement for the ram 8 and the speed of advancement for the stamp 11 by known means.

It is thus possible to provide continuous movement for both, namely the ram 8 and the stamp 11, though at different speeds, or to provide continuous movement for the ram 8 and intermittent movement for the stamp 11.

Since means for advancing material in an extrusion process, regardless whether continuously or intermittently performed, are known, it will suffice to refer to such conventional means for advancing the encasing material or the core bodies.

Figure 11:
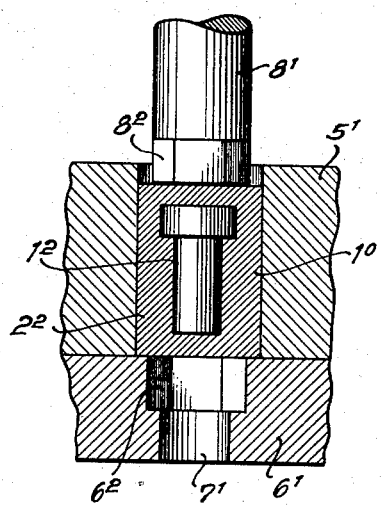
Fig. 11 is an axial section through an extrusion press with inserted encased core piece before the start of operation.

Referring now again to the drawings, and in particular to Figs. 11 to 15, the hollow extruding body 5', in which a cut portion of the encased rod 1° comprising the encasing material $2^2$ and the core body $1^2$ is inserted, is disposed adjacent a matrice 6', the recess $6^2$ of hexagonal cross-section of which terminates into a bore 7'. The cylindrical ram 8' has a head $8^2$ of hexagonal cross-section which complements the recess $6^2$ of the matrice 6'. From the half-finished rod 1° a portion is cut in such manner, that the encasing material $2^2$ surrounds completely the core body $1^2$ and is then inserted into the hollow body 5' (Fig. 11).

Figure 12:
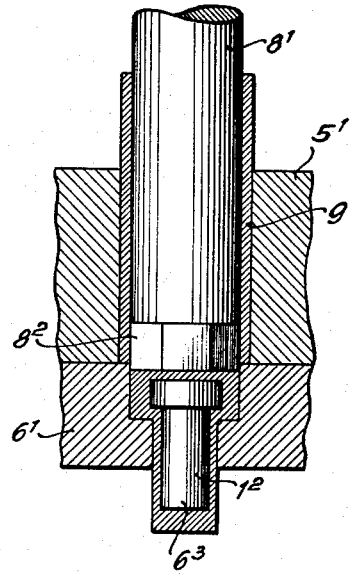
Fig. 12 is an axial section through the extrusion press of Fig. 11 at the end of the extrusion operation.
Figure 13:
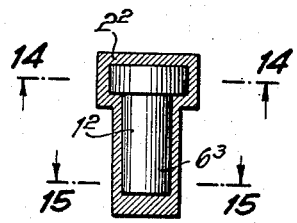
Fig. 13 is an elevation of the finished extruded article, the casing being shown in section.
Figure 14:
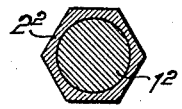
Fig. 14 is a section along the lines 14—14 of Fig. 13.
Figure 15:
Fig. 15 is a section along the lines 15—15 of Fig. 13.

Upon advancing the ram 8', $8^2$ at first the rod 1° is pressed into the hexagonal recess $6^2$ of the matrice 6' and at least partly into the cylindrical bore 7', so that the rod 1° assumes the shape $6^3$, as indicated in Fig. 12. In this position the ram 8', $8^2$ is stopped against further advancement by an abutment member (not shown) or other conventional means. During the pressing step the superfluous encasing material $2^2$ forms a sleeve 9 around the ram 8', $8^2$ and is sheared off by the front edges of the hexagonal head $8^2$ on the upper edges of the recess $6^2$. After the return stroke of the ram 8', $8^2$, the finished body $6^3$ may be pushed upwardly in usual manner and also the sleeve 9 be removed. As clearly indicated in Figs. 13 to 15, the unchanged core body $1^2$ is still completely within the encasing material $2^2$. The thus finished body $6^3$ may then be worked to a screw bolt by cutting or rolling a thread on the shaft of the body.

While I have disclosed several embodiments of the present invention, it is to be understood that these embodiments are given by example only and not in a limiting sense, the scope of the present invention being determined by the objects and the claims.

I claim:

1. A method of forming articles having core pieces, equipped with a head portion at their forward end, embedded therein comprising the steps of extruding of solid embedding material, moving said core pieces in the direction of and at a lower speed than that of the movement of said embedding material, the latter embedding successively a plurality of said core pieces spaced apart from each other by the movement of said embedding material, thereby encasing said core pieces into a rod of substantially equal thickness through its length, said thickness being greater than the largest cross-dimension of said core pieces, severing portions of said rod at a distance longitudinally spaced apart to include at least one of said core pieces embedded therein, and working into the outer surface of said embedding material in order to produce finished individual articles without laying bare said core pieces.

2. A method of forming articles having core pieces, equipped with a head portion at their forward end, embedded therein comprising the steps of extruding of solid embedding material, moving said core pieces in the direction of and at a lower speed than that of the movement of said embedding material and totally embedding a plurality of said core pieces spaced apart from each other into said material at least during a predetermined period of and by the movement of said material, thereby encasing all said core pieces into a rod of substantially equal thickness throughout its length, said thickness being greater than the largest cross-dimension of said core pieces, severing portions of the said rod together with at least one of the said core pieces embedded therein, and working into the outer surface of said embedding material in order to produce finished individual articles without laying bare said core pieces.

3. A method of forming articles having core pieces equipped with a head portion at their forward end embedded therein comprising the steps of extruding of solid embedding material, moving said core pieces, stacked axially, and parallel to the movement of the embedding material, in the direction of and at a lower speed than that of the movement of said embedding material, into the latter at least during a predetermined period of its movement, to form a rod of a cross-section greater than the greatest width of said core pieces, thereby embedding and moving successively said core pieces spaced apart from each other into said rod formed by said embedding material by means of the continuous flow of the latter.

4. The method, as set forth in claim 3, wherein said stacked core pieces are subjected to continuous axial movement.

5. The method, as set forth in claim 3, wherein said stacked core pieces are subjected to intermittent axial movement.

References Cited in the file of this patent

UNITED STATES PATENTS

| | | |
|---|---|---|
| 183,160 | Haughian | Oct. 10, 1876 |
| 309,439 | Chillingworth | Dec. 16, 1884 |
| 324,527 | Brainard | Aug. 18, 1885 |
| 658,598 | Stevens & Brady | Sept. 25, 1900 |
| 862,475 | Haywood | Aug. 6, 1907 |
| 867,658 | Hoopes | Oct. 8, 1907 |
| 1,027,240 | Clement | May 21, 1912 |
| 1,167,626 | Claremont | Jan. 11, 1916 |
| 1,754,178 | Muir | Apr. 8, 1930 |
| 1,754,466 | Hosking | Apr. 15, 1930 |
| 2,247,829 | Ziegs | July 1, 1941 |
| 2,439,084 | Graves | Apr. 6, 1948 |
| 2,535,477 | Andrae | Dec. 26, 1950 |
| 2,680,902 | Amico | June 15, 1954 |

FOREIGN PATENTS

| | | |
|---|---|---|
| 176,639 | Austria | Nov. 10, 1927 |
| 610,244 | Great Britain | Oct. 13, 1940 |